Patented May 7, 1940

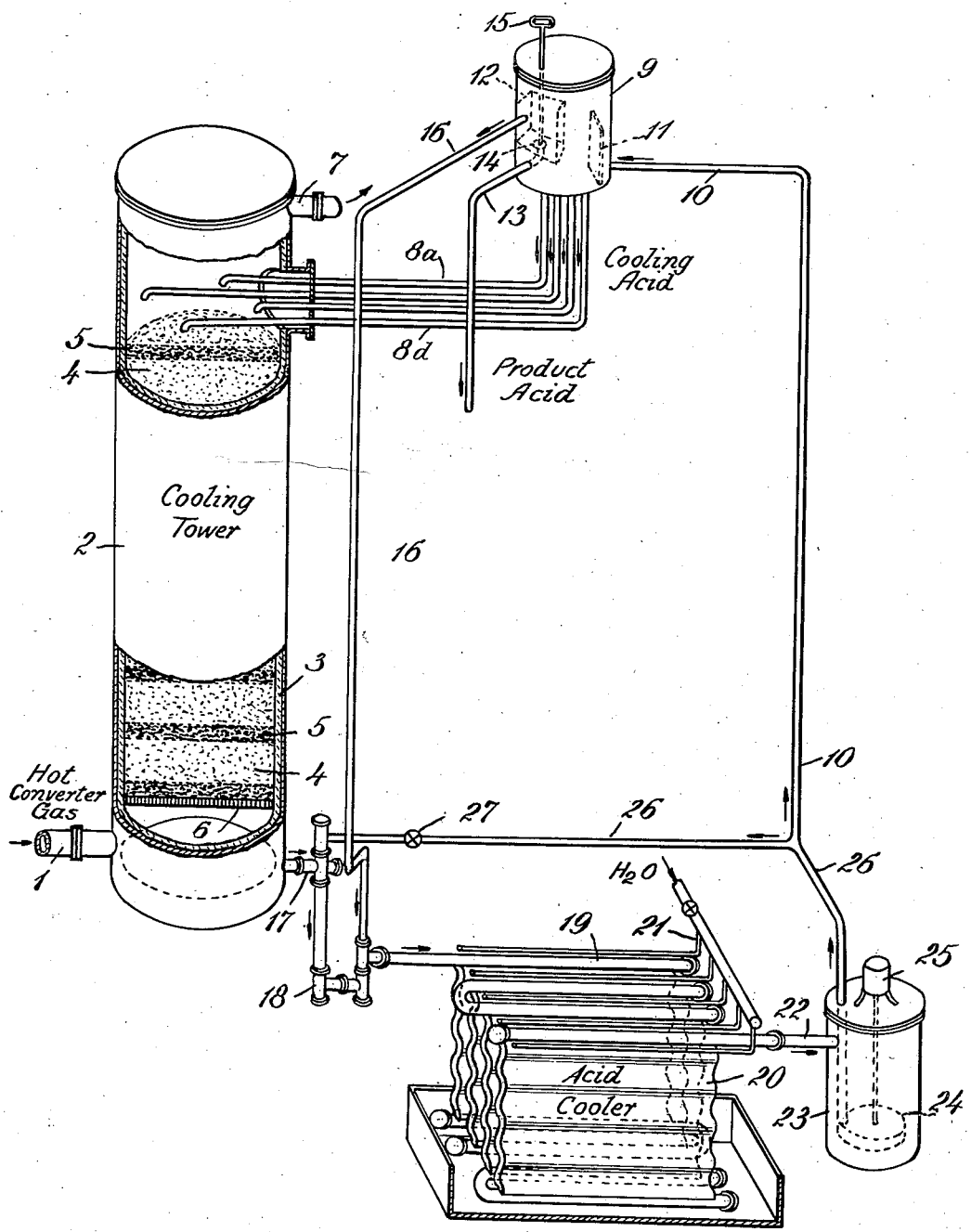

2,199,691

UNITED STATES PATENT OFFICE 2,199,691

SULPHURIC ACID RECOVERY

Bernard M. Carter, Montclair, N. J., assignor to General Chemical Company, New York, N. Y., a corporation of New York Application September 9, 1938, Serial No. 229,057

8 Claims. (Cl. 23—169)

This invention relates to the recovery of sulphuric acid from gases containing sulphuric acid vapor or mixtures of sulphur trioxide and water vapor. Such gas mixtures may result from the catalytic oxidation of sulphur dioxide by means of air containing water vapor or from the addition of water vapor to sulphur trioxide-containing gases.

In the normal operation of a catalytic converter for the conversion of sulphur dioxide to the trioxide, the gases leave the converter at temperatures on the order of 440° to 460° C. If substantial quantities of water vapor are present in the gases, cooling by ordinary rapid cooling methods results in the formation of a persistent mist.

As shown in U. S. Patent 1,771,520 of Walter S. Allen, gas mixtures containing sulphur trioxide and water vapor may be cooled to recover these constituents in the form of sulphuric acid without excessive mist formation, provided precautions are taken to avoid sudden cooling or chilling of the gas stream. Thus, the recovery may be effected by the employment of ceramic cooling tubes or other tubes protected to provide limited transfer of heat. For large installations the use of indirect heat transfer through the walls of cooling tubes is subject to the disadvantage that, in view of the limited cooling effect obtained per unit of surface area, an excessive amount of equipment is required. If ceramic tubing is employed, it is of course subject to possible breakage. Other common materials of construction, on the other hand, are subject to attack by the sulphuric acid condensate and not only is the life of such equipment short, but the sulphuric acid product is contaminated with impurities resulting from the corrosive effect of the acid.

In U. S. Patent 2,042,675 of Henry F. Merriam a process for cooling moist gas containing sulphur trioxide by direct contact with sulphur acid is disclosed. This process has the advantage that a cooling tower containing fragmentary packing material may be employed to provide the extensive surface area required and the cost of equipment for large installations may be very materially reduced.

In the process of my invention a gas containing sulphuric acid vapor or a mixture of sulphur trioxide and water vapor is cooled by generally countercurrent contact with liquid sulphuric acid which at the point of initial condensation is at a temperature between 170° C. and 230° C. Preferably the gas is cooled to a final temperature not above 110° C. To provide such a temperature using a countercurrent flow of sulphuric acid as a cooling medium, the initial acid temperature should be below 110° C.

To secure efficient operation of the cooler, acid used to cool the gas must be recirculated, i. e., it must be cooled in an external cooler and returned to contact with the gas stream for condensing additional acid. However, acid at temperatures in the neighborhood of 200° C. is exceedingly corrosive to most materials of construction, especially to materials of the type that may be economically employed as heat exchange units, pumps, etc. Hence in prior processes employing sulphuric acid as the cooling medium high acid temperatures have been avoided. If a gas containing a ratio of water vapor to sulphur trioxide corresponding to about 80% $H_2SO_4$ (by weight), or even about 98% or 100%, is to be treated, the use of low temperature acid in contact with the hot gas results in seriously objectionable quantities of mist. This seems to be true whether a low concentration of $SO_2$ on the order of 5% by volume or a high concentration on the order of 17% by volume is employed in the catalysis.

In the preferred process of the invention the condensation process is conducted so as to produce relatively hot and consequently highly corrosive sulphuric acid of about 80% $H_2SO_4$ concentration at a temperature between its boiling point and 15° therebelow (normally at elast 175° C.), and this hot corrosive acid is merged or mixed immediately with relatively cool acid, for instance 80% acid at a temperature below 110° C., to form a mixed acid substantially cooler than the hot acid; for example, the mixed acid may be at a temperature between that of the "relatively cool acid" and 130° C., in which temperature range the acid has relatively little corrosive action upon heat exchange equipment. At least part of the acid thus obtained is then cooled by heat exchange to a still lower temperature and thus provides the "relatively cool sulphuric acid."

Although this process involves the circulation of substantially more acid through the heat exchangers than in a process omitting the mixing step, it has been found that the larger quantity of acid at the lower temperatures thus employed is far less corrosive than the smaller quantity of acid at its high initial temperature. Accordingly the process of the present invention permits condensation of sulphuric acid at temperatures approximating its boiling point and provides both efficient condensation and a minimum of mist formation.

In the apparatus illustrated in the accompanying drawing, conduit 1, which may serve as an air cooler, leads from a catalytic converter (not shown), into the base of cooling tower 2. Condensing tower 2 may have an inner facing of acid-resistant brick 3 and may contain layers of acid-resistant packing 4 and 5 supported upon a perforate floor 6. The packing is shown disposed as alternate layers 4, of relatively fine packing material, for instance crushed tile or acid-resistant pebbles, and 5, of relatively coarse packing material such as "dumped" spiral tile to eliminate channeling. If desired, packing material providing a larger free space may be employed near the bottom of the tower to accommodate the larger flow of acid and larger volume of gas passing through this portion of the packing.

The tower at its top has a gas outlet 7, which may lead to a splash separator (not shown), such as a small chamber filled with triple spiral tile or coke, through which the cooled gas is passed to eliminate minor traces of mist or spray. The mist particles are relatively coarse compared with mist resulting from improper cooling and are readily separated from the gas. Entering the tower near its top are acid distributing tubes 8a—d for providing uniform distribution of acid over the cross-section of the tower. The number of acid distributing tubes is optional and will depend to a considerable extent upon the size of the unit. The distributing tubes are supplied from a manifold tank 9. This tank has an acid inlet pipe 10 and preferably some sort of baffle means, such as plate 11, arranged so that introduction of acid to the tank will not disturb the uniform flow of acid out through the several distributing tubes. A second baffle 12 provides a separate chamber into which the sulphuric acid overflows. At the bottom of this chamber is an outlet 13 provided with a valve plug 14 which may be unseated by the valve stem 15. An overflow pipe 16 leads from this chamber.

At the base of the cooling tower 2 there is an acid outlet conduit 17 leading via a ceramic-lined clean-out trap 18 into cooler 19 which may be of any convenient type, such as the Z-type illustrated, in which the acid flows down and up through zig-zag elements 20 the sides of which are sprayed with cooling water from pipes 21. Any other conventional cooling system suitable for sulphuric acid may, of course, be employed in place of the one just described.

From cooler 19 conduit 22 leads to the sump 23. This preferably is sufficiently large to hold all of the acid circulating in the tower system in the event of shut-downs. The sump 23 contains a centrifugal pump 24 driven by motor 25 for forcing liquid out through a conduit 26, having a valve 27. Conduit 26 leads back to conduit 17. It also connects with the acid inlet 10 of manifold tank 9 as shown. Valve 27 controls the ratio of acid recirculated directly via conduits 26 and 17 to acid passing to manifold tank 9. As an alternative the ratio of acid returned to the cooler directly, to acid circulated through the tower may be controlled by adjustment of the flow rate through pump 24, overflow pipe 16 serving as the direct return line. In this case valve 27 may be closed.

If acid of 98% to 100% concentration is to be produced, the metal apparatus may be constructed of cast iron or other acid-resistant metal. If a lower concentration, say 80% acid is to be prepared, lead equipment may be used. But in either case the process of the present invention improves the purity of the product acid and lengthens the life of the apparatus.

The following description is illustrative of the operation of the above apparatus.

A gas mixture containing around 7% sulphur trioxide (by volume) and sufficient water vapor to form upon total condensation a sulphuric acid of 80% $H_2SO_4$ concentration (e. g., a gas obtained by catalytic air oxidation of a water vapor, sulphur dioxide mixture produced by combustion of hydrogen sulphide, to which additional water vapor has been added) is passed through conduit 1 at a temperature around 315° C. into the base of tower 2. The gas passes up through the tower in countercurrent contact with descending cooling acid of about 80% $H_2SO_4$ concentration, introduced through tubes 8a, b, c, and d at a temperature around 93° C. The gases, cooled by the acid and thus freed from sulphuric acid, pass out at the top of the tower. The acid condensate mixed with cooling acid passes down through the tower and is gradually heated by the progressively hotter gases with which it comes in contact. The volume of acid is preferably controlled to provide an acid temperature of about 190° C. at the base of the tower. Cool acid at a temperature of about 90° to 95° C. is drawn from sump 23 by pump 24 and passed through conduit 26 to conduit 17 and is mixed therein with the hot acid from the base of the tower 2. The proportions of acid are controlled by means of valve 27 to provide a mixed acid temperature of about 120° C. With the type of gases mentioned, the weight or volume ratio of acid recirculated directly, to acid conveyed to manifold 9 may be on the order of 3 or 4 to 1. This ratio will vary with variations in composition of the gas being treated and in temperatures of the gas and the acid. The mixed acid passes via trap 18 into cooler 19 where it is cooled to around 93° C. before passing to sump 23. As the volume of acid increases as a result of condensation in tower 2, the acid level in manifold tank 9 is raised until acid overflows partition 12. From the separate compartment provided by this partition the product acid may be withdrawn continuously or intermittently by manipulation of the valve plug 14. During periods when the product acid valve is closed, excess acid overflows via pipe 16 to the cooler 19.

Instead of circulating all of the acid through the indirect cooler as described in the above example, the hot acid may be cooled to the desired final temperature by admixture with relatively cool acid and a portion of the resulting cool acid may be circulated directly to the manifold 9 without passing through the indirect cooler. All of the acid passing through the indirect cooler, on the other hand, may be mixed with the hot acid from tower 2.

Since the method previously described, involving circulation of all of the acid through the indirect cooler, yields a higher heat efficiency, it is the preferred method of operating.

I claim:

1. In the recovery of sulphuric acid from a hot gas by bringing the hot gas into contact with cooler sulphuric acid in a gas-liquid contact zone thereby heating the acid to a high temperature, the improvement which comprises mixing the hot acid with relatively cool acid to form a mixture at a temperature substantially below that of the hot acid, passing at least part of the mixture into a heat exchanger to cool the mixture, returning part of the mixture to the contact zone, and mixing at least part of the cooled mixture with additional hot acid.

2. In the recovery of sulphuric acid from a hot gas by bringing the hot gas into contact with cooler sulphuric acid in a gas-liquid contact zone, the improvement which comprises passing the gas into countercurrent contact with sulphuric acid and regulating the flow of sulphuric acid so that the sulphuric acid is heated to a final temperature between 170° C. and 230° C., mixing the hot acid with relatively cool acid to form a mixture at a temperature substantially below that of the hot acid, passing at least part of the mixture into a heat exchanger to cool the mixture, returning part of the mixture to the contact zone, and mixing at least part of the cooled mixture with additional hot acid.

3. In the recovery of sulphuric acid from a hot gas by bringing the hot gas into contact with cooler sulphuric acid in a gas-liquid contact zone thereby heating the acid to a high temperature, the improvement which comprises withdrawing the hot acid from said contact zone, mixing the hot acid with relatively cool acid to form a mixture at a temperature substantially below that of the hot acid, passing the mixture into a heat exchanger to cool the mixture, said heat exchanger having cooling surfaces susceptible to attack by the hot acid, passing a portion of the cooled mixture into said contact zone, and mixing another portion of the cooled mixture with additional hot acid.

4. In the recovery of sulphuric acid from a hot gas by bringing the hot gas into contact with cooler sulphuric acid in a gas-liquid contact zone thereby heating the acid to at least 170° C., the improvement which comprises withdrawing the hot acid from said contact zone, mixing the hot acid with relatively cool acid to form a mixture at a temperature below 130° C., passing at least part of the mixture into a heat exchanger to cool the mixture, said heat exchanger having cooling surfaces susceptible to attack by the hot acid, and mixing at least part of the cooled mixture with additional hot acid.

5. In the recovery of sulphuric acid from a hot gas by bringing the hot gas into contact with cooler sulphuric acid in a gas-liquid contact zone thereby heating the acid to a high temperature, the improvement which comprises withdrawing a continuous stream of the hot acid from said contact zone, merging it with a continuous stream of relatively cool acid to form a mixed acid stream at a temperature substantially below that of the hot acid, passing it into a heat exchanger to cool it, said heat exchanger having cooling surfaces susceptible to attack by the hot acid, passing a portion of the cooled mixture into said contact zone, and forming from another portion thereof said continuous stream of relatively cool acid.

6. In the recovery of sulphuric acid from a hot gas by bringing the hot gas into contact with cooler sulphuric acid in a gas-liquid contact zone thereby heating the acid to at least 175° C., the improvement which comprises withdrawing a continuous stream of the hot acid from said contact zone, merging it with a continuous stream of acid at a temperature below 110° C. in such a ratio that the mixture has a temperature below 130° C., passing the mixture into a heat exchanger to cool it to a temperature below 110° C., said heat exchanger having cooling surfaces susceptible to attack by the hot acid, passing a portion of the cooled mixture into said contact zone, and forming from another portion thereof said continuous stream of acid at a temperature below 110° C.

7. In the recovery of sulphuric acid from a hot gas by bringing the hot gas into contact with cooler sulphuric acid in a gas-liquid contact zone, the improvement which comprises passing the gas into countercurrent contact with sulphuric acid and regulating the flow of sulphuric acid so that the sulphuric acid is heated from an initial temperature below 110° C. to a final temperature between 175° C. and 230° C., withdrawing the hot acid at a temperature between 175° C. and 230° C., merging it with relatively cool acid to form a mixture at a temperature below 130° C., passing the mixture into a heat exchanger to cool it to a temperature below 110° C., said heat exchanger having cooling surfaces susceptible to attack by the hot acid, passing a portion of the cool mixture to said contact zone, and merging another portion thereof with additional hot acid from said contact zone.

8. In the recovery of about 80% sulphuric acid from a hot gas containing $H_2SO_4$ and water vapor in proportions forming about 80% $H_2SO_4$ by bringing the hot gas into contact with cooler sulphuric acid in a gas-liquid contact zone, the improvement which comprises passing the gas into countercurrent contact with sulphuric acid of about 80% concentration and regulating the flow of sulphuric acid so that the sulphuric acid is heated from an initial temperature below 110° C. to a final temperature between boiling temperature and 15 centigrade degrees therebelow, withdrawing a continuous stream of the hot acid at a temperature within 15 degrees of boiling temperature, merging it with a continuous stream of acid at a temperature below 110° C. in such a ratio that the mixture has a temperature below 130° C., passing the mixture into a heat exchanger to cool it to a temperature below 110° C., said heat exchanger having lead cooling surfaces susceptible to attack by the hot acid, passing a portion of the cooled mixture continuously into said contact zone, and forming from another portion thereof said continuous stream of acid at a temperature below 110° C.

BERNARD M. CARTER.